May 28, 1929.  W. W. McLAURIN  1,715,093

TESTING MACHINE

Filed Oct. 19, 1925

INVENTOR
William W. McLaurin,
By his Attorney,
J. H. McCready

Patented May 28, 1929.

1,715,093

UNITED STATES PATENT OFFICE.

WILLIAM W. McLAURIN, OF BROOKFIELD, MASSACHUSETTS.

TESTING MACHINE.

Application filed October 19, 1925. Serial No. 63,267.

This invention relates to testing machines, and more especially to machines for testing the strength or adhesiveness of the gumming on sealing tape, and the like.

Sealing tape usually consists of a strip of paper or cheap fabric coated on one side with an adhesive and is much used for staying the corners or edges of cardboard or fibreboard boxes, for sealing together the flaps of cartons, and numerous other uses. It is important that the tape shall not only securely hold the parts united thereby after the adhesive has dried, but that it shall also hold these parts in their sealed positions immediately after the tape has been applied to them and when, consequently, the adhesive union is weakest. For example, the tape used to seal cartons should have sufficient strength to hold the carton flaps closed immediately after the tape has been applied to them, and thus avoid the necessity of using any other means for holding the flaps in their sealed positions.

Furthermore, sealing tapes and stays are also manufactured in different grades and require adhesives of different strengths, and it is important that these different qualities or grades be kept up to standard. To do this requires some means for determining the strength of the adhesive union made by a given grade or quality of sealing tape. The present invention deals with the problem presented by these conditions and it aims to devise a simple and thoroughly practical machine by means of which the strength of the adhesive can be easily determined.

The nature of the invention will be readily understood from the following description when read in connection with the accompanying drawings, and the novel features will be particularly pointed out in the appended claims.

Figure 1:
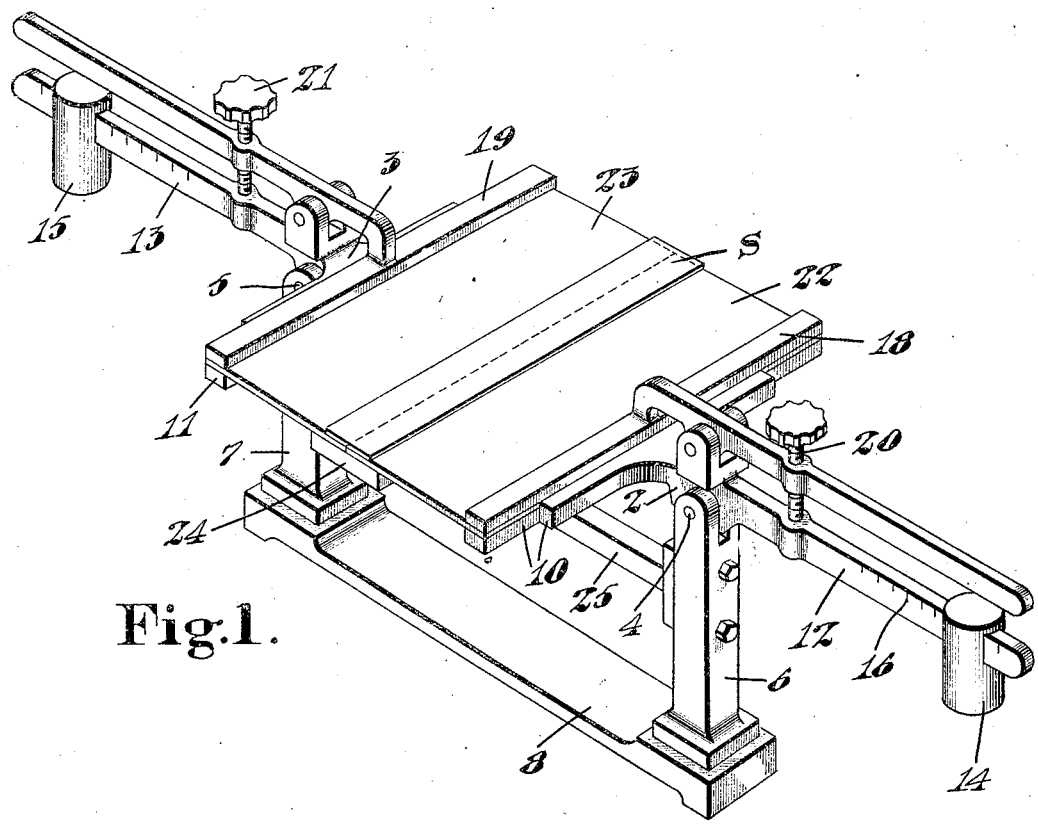
Figure 2:
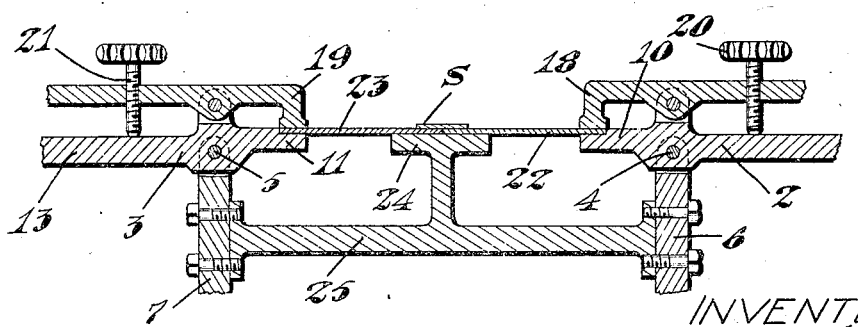

In the accompanying drawings,

Figure 1 is a perspective view of a testing machine constructed in accordance with the present invention; and Fig. 2 is a vertical cross sectional view through a part of the machine shown in Fig. 1.

The machine shown comprises two brackets 2 and 3 supported on pivots 4 and 5, respectively, which are mounted in the upper ends of standards 6 and 7. These standards are connected by and supported on a base 8. At one side of the pivot 4 the bracket 2 is provided with a long flat jaw 10, while an arm 12 projects from said bracket at the opposite side of said pivot and supports a weight 14, this arm being graduated, as indicated at 16, Fig. 1. Pivoted on the bracket 2 is another jaw 18 having a rearwardly projecting arm through which is threaded an adjusting screw 20, the lower end of this screw bearing on the arm 12 and serving, when tightened up, to force the jaw 18 firmly against the jaw 10. Similar parts are associated with the bracket 3, said parts including a jaw 11 and a weight arm 13 to receive a weight 15. An upper jaw 19 cooperates with the jaw 11 and is arranged to be clamped thereagainst by an adjusting screw 21.

The two pairs of jaws may be made to grip and securely hold two testing plates 22 and 23, respectively, which may be made of metal, but more usually consist of fibreboard, cardboard, or other material of the same nature as that to which the sealing tape is to be applied. A rest 24 is formed integral with a bar 25 which connects the two standards 6 and 7, and is arranged to support the marginal portions of the plates 22 and 23 opposite to the margins thereof which are gripped by the respective jaws.

Assuming, for example, that it is desired to test the strength, while moist, of the adhesive coating on sealing tape intended especially to be used in sealing carton flaps, two sections of cardboard of which carton flaps are made, would be inserted in the jaws and would form the plates 22 and 23, these parts being clamped securely in their proper positions. A sealing strip S then would be moistened and applied to the margins of the plates, as shown in Figs. 1 and 2, thus adhesively securing them together. The weights 14 and 15 next would be moved gradually outward on their respective arms 12 and 13 thus tending to disrupt the adhesive union between the plates and the strip. The force so applied could be gradually increased by adjusting the weights until a relative slip starts between the sealing tape and one of the testing plates 22 or 23. The weight arms 12 and 13 may be graduated either in pounds, or the graduations may simply be numbered, so that in either event a relative indication of the strength of the adhesive union will be given.

It will be observed that the mounting of the brackets 2 and 3 permits a relative movement of the plates 22 and 23 resembling the movement of the carton flaps as they tend to open under their own resiliency after being sealed, so that the conditions under which carton sealing tape is used are closely simulated. The machine is equally useful, however, in testing gummed or adhesively coated tape used for other purposes. In some cases it may be advantageous to make the plates 22 and 23 of metal and to cover them, at least on one side, with paper, cardboard, or other material to which the sealing tape is to be applied. This is particularly desirable where the sealing tape to be tested is intended for general use in sealing packages and the like, and where, consequently, it is desired to test its adhesiveness to wrapping paper.

After standards for different grades have been worked out and the adjustment of the weights 14 and 15 consequently have been determined for corresponding grades, it is simply necessary to set these weights to the desired points and then apply the sealing tape and see whether or not it will hold the test plates 22 or 23 against the disruptive forces exerted by the weights 14 and 15.

The machine thus affords a very convenient means of testing samples of different runs of gummed paper, and determining whether or not they are up to standard. It also can be used conveniently to determine the ultimate strength of gummed papers, or the adhesive union afforded by such papers. In fact, the machine is useful to the manufacturers or users of gummed paper or gummed cloth for a great variety of purposes.

While I have herein shown and described the best embodiment of my invention that I have so far devised, it will be evident that the invention may be embodied in many other forms without departing from the spirit or scope thereof.

Having thus described my invention, what I desire to claim as new is:

1. In a testing machine, the combination of two members arranged to be joined by a strip of sealing tape adhesively united to at least one of said members, means supporting said members for relative swinging movement in a direction tending to disrupt said adhesive union, means adjustable to gradually increase the disruptive strain, and a scale associated with said means for indicating the relative intensity of the strain so applied.

2. In a testing machine, the combination of two plates arranged edge to edge, whereby they may be joined by a strip of adhesive tape, means for supporting said plates for relative swinging movement to separate them and thereby to disrupt the adhesive union between one of said plates and said tape, and means for indicating the relative intensity of the strain so applied.

3. In a testing machine, the combination of two plates, means for supporting said plates for swinging movement about axes lying parallel to the plates, said axes being so spaced that the plates may be swung into an edge to edge relationship, whereby the plates may be joined by a strip of adhesive tape, a rest for supporting said plates in said relationship, a weight arm attached to one of said plates, and a weight adjustable on said arm to swing said plate and thereby to move the plate in a direction tending to disrupt the union between one of said plates and the tape, and graduations on said arm for indicating the relative intensity of the force so applied.

4. In a testing machine, the combination of a bracket, means supporting said bracket for swinging movement, a graduated weight arm projecting from said bracket, a weight adjustable on said arm, a testing plate carried by said bracket, and a part cooperating with said plate and arranged to be adhesively united thereto by a sealing strip.

5. In a testing machine, the combination of two brackets mounted to swing on substantially parallel axes, weight arms projecting from said brackets, weights adjustable on said arms, said brackets being arranged to support two testing plates, one on each bracket, so that the edges of said plates will substantially meet in a single plane and can be swung away from each other by moving said weights outwardly along the respective arms of said brackets, and a rest for supporting said plates in said plane.

6. In a testing machine, the combination with two jaws each adapted to grip a test plate, said jaws being spaced apart, whereby the two plates may be positioned in substantially an edge to edge relationship where they may be joined by a strip of adhesive tape, means for supporting said jaws for swinging movement about substantially parallel axes to apply strain to the adhesive union between said plates and tape, and means for indicating the relative intensity of the strain so applied.

7. In a testing machine, the combination with two jaws each adapted to grip a test plate, said jaws being spaced apart, whereby the two plates may be positioned in substantially an edge to edge relationship where they may be joined by a strip of adhesive tape, means for supporting said plates for swinging movement about substantially horizontal parallel axes to apply strain to the adhesive union between said plates and tape, means for relatively swinging said jaws about said axes, and means for indicating the relative intensity of the strain applied by said swinging movement.

WILLIAM W. McLAURIN.